March 26, 1929.  A. HULL  1,706,528
TIRE TOOL
Filed March 10, 1928  2 Sheets-Sheet 2
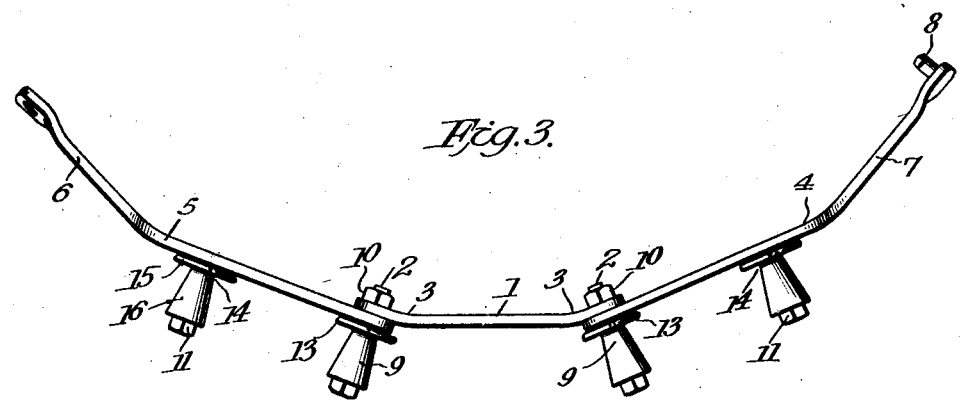
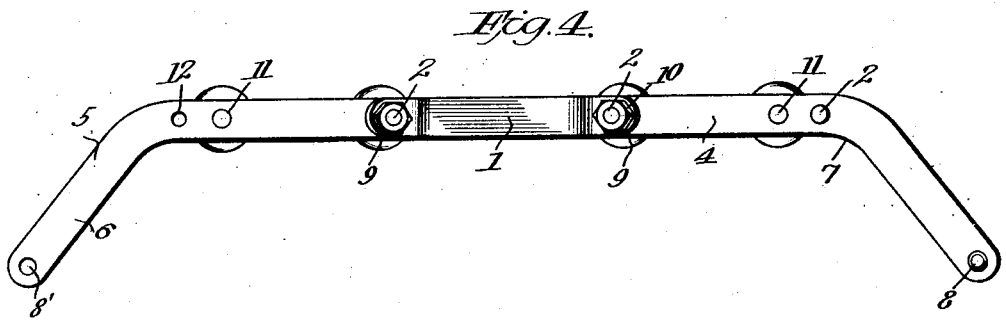
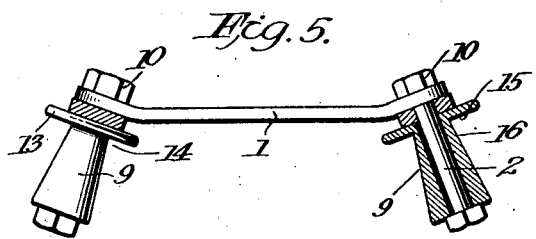
Inventor
Arthur Hull
By Cushman Bryant Darby
Attorneys Patented Mar. 26, 1929.

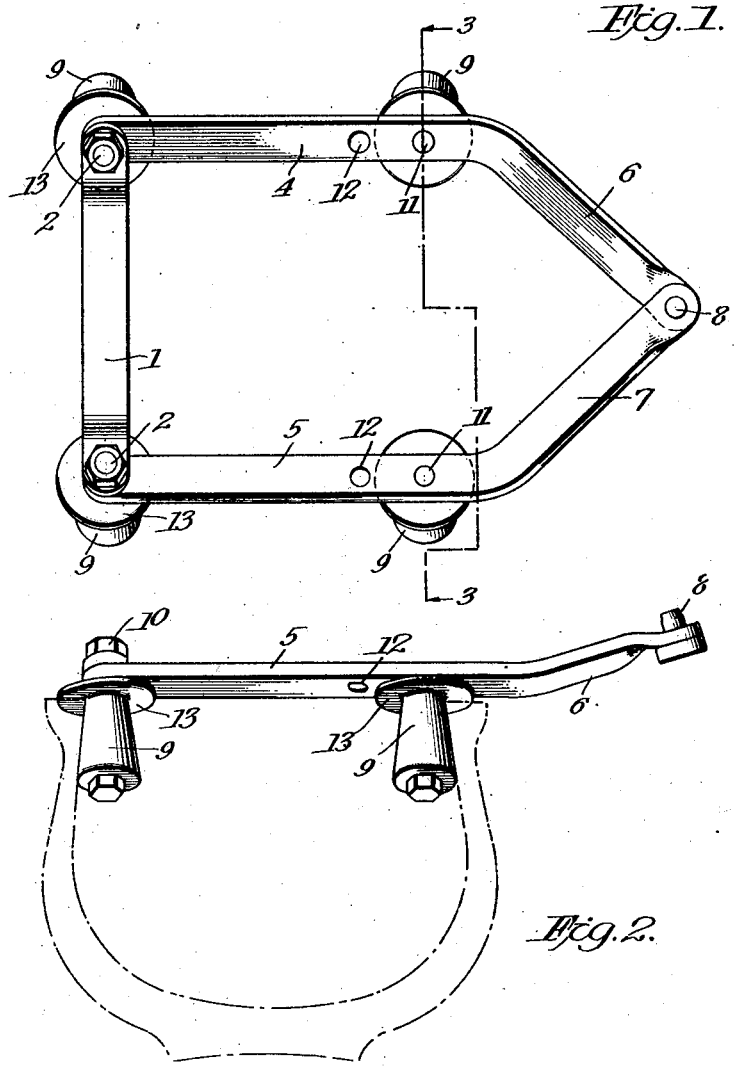

1,706,528

UNITED STATES PATENT OFFICE.

ARTHUR HULL, OF DECATUR, ILLINOIS.

TIRE TOOL.

Application filed March 10, 1928. Serial No. 260,610.

This invention relates to a spreader adapted for use in connection with rubber tires, principally with the shoe or outer casing of automobile tires.

The object of the invention is to provide a tool of simple, yet efficient construction, which can be inserted in the tire casing to hold the same in a spread position, thereby facilitating accessibility while repairing or otherwise manipulating the inside of the tire.

A further object of the invention is to provide a device which can be used with any type or size of tire casing without necessity of adjustment.

One advantage of the invention resides in the extreme simpleness in use, there being but one operation to cause the desired result.

Still another object of the invention is to provide a construction which is strong and may be manufactured with such cheapness as to supply the universal demand for such articles.

In the drawings similar reference characters are employed to designate corresponding parts throughout the several views and in which:

Figure 1 is a plan view of the device in operative position.

Figure 2 is a side view of the device in operative position.

Figure 3 is a side view of the device in inoperative position.

Figure 4 is a top view of the device in inoperative position.

Figure 5 is a section of the device on the line 3—3 of Figure 1.

The tool is constructed of any suitable metal of a thickness conforming to the necessary strength with which to withstand the pressure of use.

It comprises the bar 1, the ends of which are rounded and punched with holes to receive the bolts 2. A short distance from the ends of the bar 1 are slight bends 3 which will cause the ends of the bar to be upwardly turned when the device is in operative position. Two arms 4 and 5, which are substantially longer than the bar 1, are pivoted to the ends of said bar. These arms are curved inwardly and upwardly at their ends 6 and 7, so that they meet at a point in line with the center of the bar 1 when in operative position, as shown in Figures 1 and 2. Due to the upward bending of the ends of the bar, the arms will assume a slanting position when compared with the position of the bar.

The extremities of the arms are rounded and at the end of arm 4 extending at right angles thereto is a pin 8 to engage a hole 8' in an identical point in arm 5 and thereby lock the device in operative position. At the point where the pin and hole are placed respectively, the arms are slightly bent from their slanting positions so that they are substantially horizontal to the bar 1.

The screw threaded bolts 2 pass through rollers 9, the arms 4 and 5 respectively, and the bar 1 and are held thereto by lock nuts 10. Sufficient looseness is allowed the bolt so that a pivotal action may be had between the arms and the bar and so that the rollers may easily revolve.

Another set of rollers are held on the arms by screw threaded bolts 11 at points substantially midway the length of the arms. The position of these rollers may, when desired, be changed as evidenced by the screw threaded holes 12. This adjustment is purely arbitrary and is not intended to be used at each operation of the device, but only where necessity dictates.

The rollers 9 are provided with a flange 13 and a circumferential depression 14 so that a shoulder 15 and a divergent wall 16 are formed, whereby it is adapted to receive the beads of the tire.

Because of the slanting of the arms, the rollers extend outwardly from a line running longitudinally through the device when in operative position. This feature allows the rollers to conform to the shape of the tire and effect a better grip upon the bead edges of the tire casing.

The operation of the spreader is of simple nature. The device is placed in the tire casing in an unlocked and inoperative position spread to its entire length, as shown in Figure 3. Because of its semi-circular shape when in this position, it will conform to the curvature in the tire. The arms of the device are then grasped and pulled towards each other until they slightly overlap, and the pin in one arm may be slipped into the hole in the other arm. To remove the spreader, the reverse operation is made.

In this way, the tire is spread open in such a manner as to give sufficient room for inspection, or repair.

The rollers allow the spreader to be moved entirely around the inside of the tire to any desired point, thereby eliminating the necessity of detaching and attaching the device when different portions of the casing need attention.

The tool when in operative position forms a very rigid device with no possibility of collapsing until the locking members are disengaged.

I claim:

A device of the class described, comprising a bar turned upwardly at its ends, arms pivotally connected to the upturned ends and converging to a point substantially equidistant the pivotal points, one pair of rollers mounted at the pivotal points, another pair of rollers mounted between the ends of said arms, and means for connecting the ends of said arms to form a substantially rectangular frame.

In testimony whereof I have hereunto set my hand.

ARTHUR HULL.